UNITED STATES PATENT OFFICE.

JOHN MAYER, OF HOLLY SPRINGS, MISSISSIPPI.

SALVE.

SPECIFICATION forming part of Letters Patent No. 256,847, dated April 25, 1882.

Application filed December 19, 1881. (No specimens.)

*To all whom it may concern:*

Be it known that I, JOHN MAYER, a citizen of the United States, residing at Holly Springs, county of Marshall, and State of Mississippi, have invented a new and useful composition of matter forming a salve for the cure of piles, burns, ring-worms, bone-felons, skin-diseases, &c., of which the following is a specification.

The composition consists in the following ingredients, used in the proportions stated: extract of red-oak bark, one pound; extract of tobacco, one pound; lard, one pound; beeswax, one pound. Boil all water out and set to cool. Dissolve one-half pound rosin by heating, add it to the mixture, and stir continually until cool.

To use for piles, wash the parts and anoint with the salve night and morning. For sores, bunions, corns, &c., make a plaster on old linen and apply twice a day.

Having thus described my invention, what I claim as new, and desire to secure by Letters Patent, is—

The herein-described compositions of ingredients, consisting of red-oak bark, tobacco, lard, and beeswax, combined with rosin, in the proportions specified.

JOHN MAYER.

Witnesses:
 JOHN R. McCORROLL,
 I. B. MATTISON.